UNITED STATES PATENT OFFICE 2,331,650

PREPARATION OF ORGANIC SULPHIDES

Edward S. Blake, Nitro, W. Va., assignor to Monsanto Chemical Company, St. Louis, Mo., a corporation of Delaware No Drawing. Application September 11, 1940
Serial No. 356,373

4 Claims. (Cl. 260—545)

This invention relates to the preparation of organic sulphides from acid halides and inorganic water soluble sulphides.

It is an object of this invention to provide an improved process for the manufacture of organic sulphides from acid halides. A further object is to provide a method for the preparation of organic sulphides in aqueous media from inexpensive raw materials. A further object is to provide an economical and efficient process whereby high yields of organic sulphides possessing a high degree of purity are obtained. Other objects will be apparent from the description following.

As is well known acid halides are decomposed by water. However it is possible to carry out many of their reactions in aqueous media where the rate of the desired reaction is materially greater than that of the hydrolysis of the acid halide. Particularly with the halides of the weaker organic acids reactions in aqueous media are practical and obviously it is of considerable advantage to employ water in place of expensive organic solvents. While the reaction of acid halides with water soluble sulphides affords a satisfactory reaction rate, the sulphides are likewise readily hydrolyzed in aqueous solution. Therefore in reacting a water soluble sulphide with an acid halide in aqueous solution, considerable hydrogen sulphide is normally lost which results in greatly diminished yields.

In accordance with the present invention it has been found that vastly improved results attend the addition of a stabilizing agent for the water soluble sulphide. As stabilizing agents there may be employed extra sufficient basic material to keep the pH of the reaction mixture above about 6.0 throughout the duration of the reaction or simply a neutral salt having a cation in common with that of the metallic sulphide. Preferably the two effects are combined and there is employed a base having a cation in common with that of the sulphide. That is to say sufficient basic material is added to maintain the pH above about 6.0 which base further functions to decrease the dissociation of the sulphide through a common ion effect.

Since the desired reaction between the halide and the sulphide must compete with the hydrolysis reactions it is essential that the ingredients be brought rapidly into sufficient contact to permit reaction. Mechanical manipulation alone has not proved satisfactory. However it has been found that rapid and intimate contact of the acid halide with an aqueous solution of an inorganic sulphide may be effected by efficient stirring providing there is present a suitable wetting agent. While its function may not be limited to that described above or even properly explained thereby, nevertheless it has been observed that markedly improved results attend the use of a wetting agent. In the absence of a stabilizing agent for the sulphide or where for other reasons there is a material evolution of hydrogen sulphide most wetting agents cause excess foaming and can not be used by application of the principles of this invention the advantages of their use may be had. The wetting agents available commercially are satisfactory for use in the invention. These include products marketed under the following trade names, the information concerning their structure as furnished by the supplier also being given: Santomerse, an alkylated aryl sulphonate; Gardinol WA, the sodium salt of the sulphate of technical lauryl alcohol; Triton M-25, the sodium salt of an organic ether acid; Alphasol OT, the sodium salt of an alkyl ester of sulphosuccinic acid; Igepon T, a material having the formula $C_{17}H_{33}CONHCH_2CH_2SO_3Na$; Areskap, mono butyl phenyl phenol sodium monosulphonate; Aresklene, dibutyl phenyl phenol sodium disulphonate and Aresket, monobutyl diphenyl sodium monosulphonate.

It has been found that the desired reaction is further favored by proper control of the reaction conditions. In particular it is desirable to carry out the reactions in the cold, as for example at temperatures of $-5°$ C. to $+15°$ C. In general it is preferred to carry out the bulk of the reaction from $0°$ C. to about $12°$ C. In addition, use of concentrated solutions represses undesirable side reactions so that it is preferred to add the acid halide to an aqueous solution of the sulphide and stabilizing agent saturated with respect to sulphide at the temperature of reaction.

Particularly suitable in the present process are the halides of organic carboxylic acids belonging to the aromatic series. Thus the preferred group to which the present invention is directed are compounds possessing the formula

where X is halogen and R is an aryl radical which may be substituted. For convenience these compounds will be hereinafter referred to as aroyl halides. Typical examples suitable in the present invention comprise naphthoyl chloride, benzoyl bromide, p-chlor benzoyl chloride, m-chlor benzoyl chlorid, p-nitro benzoyl chloride, p-toluyl bromide, m-toluyl chloride, p-ethyl benzoyl chloride, mesitoyl chloride and analogues and equivalents thereof.

The following examples are illustrative of the invention but in nowise limitative thereof.

Example I

Substantially 50 parts by weight of hot water were added to 35 parts by weight of 60% sodium mono sulphide. A small proportion of clay was added to facilitate filtering and the solution filtered hot from insoluble impurities. About one part by weight of a wetting agent as for example Santomerse was added to the clear aqueous sodium sulphide solution and 7 parts by weight of sodium carbonate. To the rapidly stirred charge maintained below 15° C. substantially 70.5 parts by weight of benzoyl chloride were added. After completion of the reaction the dibenzoyl sulphide was filtered from the reaction mixture, washed thoroughly with water and dried. The yield was about 92% of theory. The pH of the filtrate after separation of the desired reaction product was about 8.3 as measured by a glass electrode in conjunction with a standard saturated calomel half cell.

Example II

Substantially 300 parts by weight of hot water were added to 140 parts by weight of 60% sodium mono sulphide. About ten parts by weight of clay were added to facilitate filtering and the solution filtered from insoluble impurities. To the clear aqueous sodium sulphide there was added 4 parts by weight of a wetting agent and 94 parts by weight of $Na_2HPO_4.12H_2O$ and the mixture cooled to $-5°$ C. Substantially 282 parts by weight of benzoyl chloride were added to the efficiently stirred cold sulphide solution, the temperature being kept below about 12° C. After completion of the reaction the dibenzoyl sulphide was filtered from the reaction mixture, washed thoroughly with water and dried. The yield was about 97% of theory. The pH of the filtrate after separation of the desired reaction product was about 6.3 as measured by a glass electrode in conjunction with a standard saturated calomel half cell.

The pH of the reaction mixture falls materially lower in the absence of basic material such as sodium carbonate or disodium phosphate employed in the above examples, and the yields likewise are considerably decreased. For example in an experiment identical with Example II above but in the absence of the disodium phosphate the yield was about 25% lower and the filtrate obtained after separation of the desired product exhibited a pH of 4.0 as determined by a glass electrode. It will be appreciated that the yields would be even further depreciated by employing greater dilution of sodium sulphide or higher reaction temperatures. In connection with the latter, the rate of addition of the aroyl halide is governed solely by the efficiency of the cooling and if the cooling is sufficient to take care of the heat liberated by the reaction so that the temperature may be maintained below about 15° C., the aroyl halide may be added in one charge.

Example III

As a further specific example of the invention substantially 56 parts by weight of 60% sodium mono sulphide, 75.5 parts by weight of water, 32.0 parts by weight of borax and one part by weight of a suitable wetting agent as for example Santomerse were charged into a glass lined reactor fitted with a stirring mechanism. The mixture was warmed and stirred until a homogeneous solution was obtained and then while stirring rapidly the solution was cooled quickly to 0°–15° C. and substantially 115 parts by weight of benzoyl chloride added at a moderate rate. Stirring was continued for a short time after the addition of the benzoyl chloride, the temperature being maintained at 10–15° C. The product which had separated from the solution was then filtered off, thoroughly washed with water and dried. There was obtained 92.5 parts by weight of dibenzoyl sulphide, melting at 46–48° C. This corresponds to a yield of about 93% based on the weight of the benzoyl chloride. The pH of the filtrate from the reaction carried out as described above was about 6.5.

The amount of stabilizing agent which will assure good results is subject to considerable variation. With increasing dilution greater amounts are required so that where possible it is preferred to employ the stabilizing agent with a sulphide solution having dissolved therein three or more mols of sulphide per liter. With solutions of this concentration for example a sodium mono sulphide solution and a stabilizing agent comprising a sodium salt having an alkaline reaction, the ratio of the sodium content of the stabilizing agent to that of the sodium sulphide should be at least 1 to 5. Thus, using borax in conjunction with sodium sulphide, when the molar ratio of the borax to the sodium sulphide was lowered to 1:6 the yields fell off sharply. In the case of neutral salts as stabilizing agents where the only effect presumably is that of a common ion the ratio of stabilizing agent is preferably much higher as for example an amount furnishing a metallic ion in about the same amount as would be available from the sulphide upon complete dissociation, or even higher amounts if the stabilizing salt is sufficiently soluble. The following example describes a preparation using as the stabilizing agent a neutral salt.

Example IV

Substantially 50 parts by weight of hot water were added to 35 parts by weight of 60% sodium mono sulphide. The solution was filtered hot from insoluble impurities and 1 part by weight of a wetting agent and 35 parts by weight of sodium chloride added thereto. The solution was then chilled to about 0° C. and substantially 70.5 parts by weight of benzoyl chloride added at such a rate that the temperature of the reaction mixture did not rise above 12° C. After completion of the reaction the dibenzoyl sulphide was filtered from the aqueous vehicle, washed with water and dried. The yield was 84% of theory.

Example V

As a further example of the present invention di-p-chlor benzoyl sulphide was prepared in good yield from p-chlor benzoyl chloride and sodium mono sulphide following substantially the procedure outlined in Example III.

Example VI

Aroyl polysulphides may be obtained from aroyl halides and alkali metal polysulphides as for example dibenzoyl disulphide from benzoyl chloride and sodium disulphide or where preferred by heating an aroyl mono sulphide with sulphur. However, it is unnecessary to isolate the mono sulphide and higher sulphides may be prepared in a single step as set forth in the following specific embodiment of the invention.

Into a suitable vessel there was charged 35 parts by weight of 60% sodium sulphide and 75 parts by weight of hot water. After filtering off any insoluble impurities 8.6 parts by weight of sulphur were added and the mixture heated to effect solutions. 1 part by weight of a suitable wetting agent as for example Santomerse was added together with 25.0 parts by weight of borax and the charge cooled to $-10°$ C. Substantially 70.5 parts by weight of benzoyl chloride were added in a single charge to the cold mixture so prepared and after stirring for a short period to complete the reaction the precipitated solids were filtered off and washed thoroughly with water and dried. There was obtained in this manner a good yield of dibenzoyl disulphide.

Again this invention is not limited to the examples describing specific embodiments of the invention. Other stabilizing agents than those specifically mentioned may be employed where convenient or desirable as for example sodium bicarbonate, trisodium phosphate, tetra sodium pyrophosphate and the like. Obviously salts having an acid reaction such as mono sodium phosphate (pH about 4.5) are not suitable.

This invention is limited solely by the claims attached hereto as part of the present specification.

What is claimed is:

1. The method of making dibenzoyl sulphide which comprises reacting substantially two molecular proportions of benzoyl chloride with substantially one molecular proportion of sodium sulphide in cold aqueous solution substantially saturated with respect to sodium sulphide in the presence of a wetting agent and borax in amount sufficient to keep the pH of the reaction mixture above about 6.0.

2. The method of making dibenzoyl sulphide in aqueous medium which comprises reacting substantially two molecular proportions of benzoyl chloride with substantially one molecular proportion of sodium sulphide in cold concentrated aqueous solution containing in addition a wetting agent and a basic sodium buffer salt sufficient to keep the pH above about 6.0 during the reaction.

3. The method of making dibenzoyl sulphide in aqueous medium which comprises reacting substantially two molecular proportions of benzoyl chloride with substantially one molecular proportion of an alkali metal sulphide in cold concentrated aqueous solution containing in addition a basic buffer salt sufficient to keep the pH above about 6.0 during the reaction.

4. The method of making a diaroyl sulphide in aqueous medium which comprises reacting substantially two molecular proportions of a diaroyl chloride with substantially one molecular proportion of an alkali metal sulphide in cold concentrated aqueous solution containing in addition a basic buffer salt sufficient to keep the pH above about 6.0 during the reaction.

EDWARD S. BLAKE.